(No Model.)
G. W. PELTON.
CRANK HANDLE.
No. 471,328.  Patented Mar. 22, 1892.
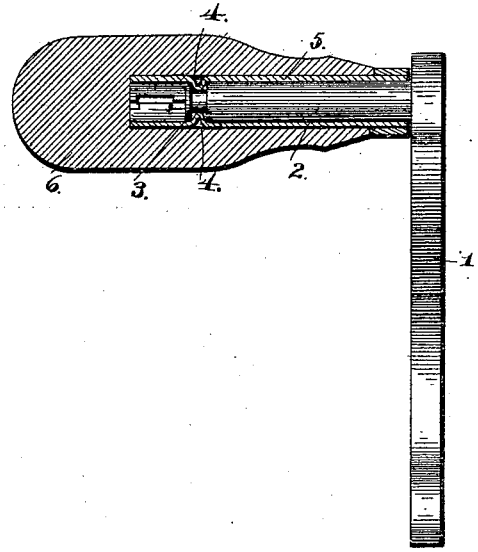
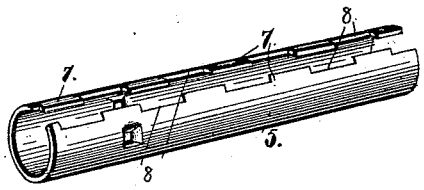
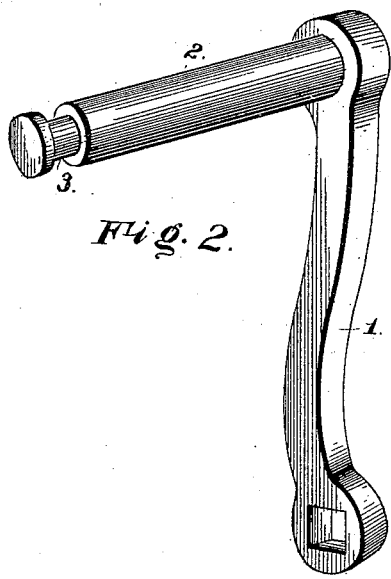
Witnesses
Chas. G. Ford.
N. F. Riley
Inventor
George W. Pelton.
By his Attorneys,
C. A. Snow & Co.

UNITED STATES PATENT OFFICE.

GEORGE W. PELTON, OF MUSCATINE, IOWA, ASSIGNOR OF ONE-HALF TO JAMES FITZGERALD, OF SAME PLACE.

CRANK-HANDLE.

SPECIFICATION forming part of Letters Patent No. 471,328, dated March 22, 1892.

Application filed December 31, 1891. Serial No. 416,651. (No model.)

*To all whom it may concern:*

Be it known that I, GEORGE W. PELTON, a citizen of the United States, residing at Muscatine, in the county of Muscatine and State of Iowa, have invented a new and useful Crank-Handle, of which the following is a specification.

The invention relates to improvements in crank-handles.

The object of the present invention is to simplify and improve the construction of crank-handles, especially the attachment of the handle proper to the spindle on which it is swiveled.

The invention consists in the construction and novel combination and arrangement of parts hereinafter fully described, illustrated in the accompanying drawings, and pointed out in the claims hereto appended.

In the drawings, Figure 1 is a sectional view of a crank-handle. Fig. 2 is a detail perspective view of the crank. Fig. 3 is a similar view of the bushing.

Like numerals of reference indicate corresponding parts in all the figures of the drawings.

1 designates a crank having a spindle 2, which is provided near its outer end with an annular groove 3, which is adapted to be engaged by projections 4 of a bushing 5, whereby a wooden handle 6 is swiveled on and securely fastened to the spindle 2. The projections 4 are formed by depressions made in the outer face of the bushing, which is open, and when the handle, which is provided with a longitudinal socket, is forced over the bushing the projections are engaged into the annular groove of the spindle.

The cylindrical metal bushing is open and is provided along its longitudinal edges with alternately-disposed teeth 7, the intervals of which form recesses 8 and which form an interlocking joint. The teeth by forming an interlocking joint prevent the bushing from collapsing, and the bushing expands sufficiently to engage the wooden handle and tightly secure the same to it. It will thus be seen that simple, inexpensive, and effective means are provided for swiveling the handle on and securing it to a spindle of a crank-handle.

What I claim is—

1. A crank-handle comprising a crank having a spindle provided with an annular groove, an open bushing arranged on the spindle and provided with a projection adapted to engage the groove, and a handle fitting over the bushing and forcing the projection into the groove, substantially as described.

2. A crank-handle comprising a crank provided with a spindle having an annular groove, an open bushing arranged on the spindle and having a projection to engage the groove and provided along its longitudinal edges with alternately-disposed teeth, forming an interlocking joint, and a handle fitting over the bushing to close the same and to force the projection into the groove, substantially as described.

3. A crank-handle comprising a crank having a spindle provided with an annular groove, a bushing arranged on the spindle and provided with a projection adapted to engage the groove, and a handle fitting over the bushing, substantially as described.

In testimony that I claim the foregoing as my own I have hereto affixed my signature in the presence of two witnesses.

GEORGE W. PELTON.

Witnesses:
JACOB J. WALL,
W. H. FAYLE.